2,993,013
Patented July 18, 1961

2,993,013
CELLULAR POLYURETHANE AND METHOD OF PREPARING SAME

Harry W. Wolfe, Jr., Newark, Del., assignor to E. I. du Pont de Nemours and Company, Wilmington, Del., a corporation of Delaware
No Drawing. Filed Oct. 29, 1956, Ser. No. 619,087
8 Claims. (Cl. 260—2.5)

This invention relates to the preparation of cellular products and more particularly to resilient cellular products prepared from polyisocyanates.

The preparation of cellular products by the reaction of high molecular weight glycols, such as polyalkyleneether glycols and polyester glycols, with polyisocyanates and water is well known. However, in general, while these cellular products exhibit good tensile strength, tear resistance, and stability properties, they are sometimes deficient in regard to load-bearing capacity, resilience, and in appearance.

This invention has as an object to provide an improved process for the preparation of cellular products. A further object is to provide improved cellular products prepared from polyisocyanates which have improved load-bearing capacity, resilience and appearance. Other objects will appear hereinafter.

These and other objects of the following invention are accomplished by the improvement in the process of preparing cellular products from polyisocyanates, water and high molecular weight polyhydroxy compounds selected from the group consisting of polyethers and polyesters, which comprises incorporating into the reaction mass, prior to the formation of the cellular product from about 0.5 to 10.0% by weight, based on the sum of the weights of polyhydroxy compound and polyisocyanate, of an elastomer in the form of a latex, said elastomer being derived from polymerizable monomers having at least one carbon to carbon double bond. The cellular product which results from the improved process of the present invention has physically contained therein the elastomer which is derived from polymerizable monomers having at least one carbon to carbon double bond and the product exhibits improved properties over products which do not contain the elastomer.

The preparation of the novel cellular products of the present invention may be carried out by various general procedures involving the reaction of the high molecular weight polyhydroxy compound, the polyisocyanate, and water. In the first of these, the high molecular weight polyhydroxy compound is reacted with a molar excess of the polyisocyanate to provide an isocyanate-terminated polymer. To this is then added the latex of an elastomer prepared from polymerizable monomers having at least one carbon to carbon double bond. Part or all of the water necessary to react with the isocyanate groups of the isocyanate-terminated polymer is present in the latex. Additional water may be added if required. A cellular product results due to the liberation of carbon dioxide by reaction of the water with the free isocyanate groups. Another method available is to react the high molecular weight polyhydroxy compound with the polyisocyanate simultaneously with the addition of the elastomeric latex. Representative methods of preparation will be more particularly illustrated in the following examples. It is quite obvious that various modifications may be made in the processes for the preparation of these novel cellular products without departing from the spirit and scope of the present invention.

As mentioned above, the cellular products of the present invention are obtained by an improvement in the process of preparing cellular products from high molecular weight polyether and polyester polyhydroxy compounds, polyisocyanates and water. Of the polyether polyhydroxy compounds, the polyalkyleneether glycols are representative and are preferred. The polyalkyleneether glycols are compounds which may be represented by the formula, $HO(RO)_nH$, wherein R stands for an alkylene radical and $n$ is an integer sufficiently large to give the polyalkyleneether glycol a molecular weight of at least 750. These compounds are ordinarily derived from the polymerization of cyclic ethers such as alkylene oxides or dioxolane, or from the condensation of glycols. All of the R's need not necessarily be the same in the molecule. In order that these polyalkyleneether glycols may be used to prepare the novel cellular products of the present invention, it is necessary that they be liquids. Thus, they should have molecular weights of from about 750 to 3500, with a preferred range of from about 1000 to 3000. For purposes of the present invention, a polytetramethyleneether glycol is preferred. Other polyether compounds which may be used include a polyalkyleneether-thioether glycol. This type of compound is similar to the polyalkyleneether glycol described above except that some of the ether oxygens are replaced by sulfur atoms.

The polyester polyhydroxy compounds which may be used to prepare the novel cellular products of this invention are compounds which should have molecular weights of from about 750 to 3500. These compounds may be prepared by esterification of dicarboxylic acids, such as adipic, sebacic, oxalic, etc., with a glycol or glycols, such as ethylene glycol, propylene glycol, butylene glycol, etc., the molar proportions being such as to result in terminal hydroxyl groups. Trihydric alcohols, such as glycerol, trimethylol propane, and polyhydric compounds, such as pentaerythritol, may be incorporated with the glycols. Many commercially available alkyd resins are prepared from hydroxy compounds with more than two hydroxyl groups and may be used in the present invention. Optionally, tribasic acids may be used with the dicarboxylic acids to react with the glycols in the preparation of the polyester.

The organic polyisocyanates which are useful in preparing the novel cellular products of this invention are either organic diisocyanates or organic triisocyanates. Representative diisocyanates include toluene-2,4-diisocyanate,
m-phenylenediisocyanate,
4-chloro-1,3-phenylenediisocyanate,
4,4'-biphenyldiisocyanate,
1,5-naphthylenediisocyanate,
1,4-tetramethylenediisocyanate,
1,6-hexamethylenediisocyanate,
4,4'-methylenediphenylisocyanate,
1,10-decamethylenediisocyanate,
1,4-cyclohexylenediisocyanate,
4,4'-methylene-bis(cyclohexylisocyanate) and
1,5-tetrahydronaphthylenediisocyanate.

Mixtures of diisocyanates, such as toluene-2,4-diisocyanate and toluene-2,6-diisocyanate may be used. Representative triisocyanates include toluene-2,4,6-triisocyanate and 2,4,4'-triisocyanatodiphenylether. For purposes of the present invention, the aromatic polyisocyanates are preferred since they tend to have greater reactivity as compared to aliphatic polyisocyanates.

One of the methods available for preparing the cellular products of the present invention involves initially the formation of an isocyanate-terminated polymer by the reaction of the high molecular weight polyhydroxy compound with the organic polyisocyanate. When using an organic diisocyanate and a glycol for this reaction, the resulting product will be a polyurethane containing two terminal isocyanate groups. When using an organic polyisocyanate containing more than two free isocyanate groups, or a trihydroxy compound, the resulting product will be a polyurethane containing three or more free isocyanate groups. Compositions prepared from a polyalkyleneether glycol which contain more than two free isocyanate groups are more particularly described in copending application Serial No. 505,039, filed April 29, 1955, in the name of Barthel. Representative reactions which may be used to prepare isocyanate-terminated polymers from a polymeric glycol containing more than two free isocyanate groups are the reaction of a mixture of di- and tri-isocyanates with the polymeric glycol; the reaction of the polymeric glycol with two mols of a diisocyanate followed by the reaction with one mol of a diisocyanate to form an allophanate having three free isocyanate groups; the reaction of a dibasic acid having a hydroxyl group on its nucleus with a polymeric glycol followed by the reaction with three mols of an organic diisocyanate; the reaction of the polymeric glycol with two mols of a diisocyanate followed by the reaction with a trihydroxy compound such as glycerin; and the reaction of a trihydroxy compound such as glycerin with three mols of a diisocyanate followed by the reaction with one mol of the polymeric glycol and two mols of organic diisocyanate to yield a mixture of difunctional and trifunctional isocyanates. It is readily apparent that various modifications may be used in order to prepare isocyanate-terminated polymers containing three or more free isocyanate groups.

The free isocyanate groups, which are present on the reactants which are used to prepare the cellular products of the present invention react with the water, which is incorporated into the reaction medium by means of the latex of the elastomer which is used, to form urea linkages with the liberation of carbon dioxide. In order to prepare the desired improved resilient cellular products of the present invention, it is necessary, therefore, that the free isocyanate content be within certain limits. For purposes of the present invention, this free isocyanate content should be from about 9 to 15% by weight. This amount of free isocyanate may be present either in the isocyanate-terminated polymer which is used or by way of additional organic polyisocyanate which may be added to the reaction mass. This free isocyanate content range of from about 9 to 15% is a weight percent and hence independent of the other particular ingredients which are used in the reaction. This weight percent range is necessary in order to provide the proper amount of carbon dioxide for foaming.

As mentioned above, the improved properties of the cellular products of the present invention are brought about by the incorporation of an elastomer with the various reactants which are used prior to the actual foaming step. This elastomer is incorporated with the reactants used as an elastomeric latex, in which case at least part of the water necessary for the actual foaming step is introduced into the reaction medium by means of the latex.

The elastomers in the form of a latex which are used in the preparation of these improved cellular products are those which are derived from polymerizable monomers having at least one carbon to carbon double bond. Thus, these elastomers may be prepared from monomers containing one carbon to carbon double bond, or from conjugated dienes. These elastomers have essentially a hydrocarbon skeleton. Representative elastomers include natural rubber, butadiene-styrene copolymers, neoprene, sulfochlorinated polyethylene, chlorinated polyethylene, butadiene-methacrylate copolymers, butadiene-acrylonitrile copolymers, etc. The preparation of these elastomers from polymerizable monomers having at least one carbon to carbon double bond and the latexes of these elastomers is well known in the art. For a more detailed description of elastomer latexes prepared from polymerizable monomers having at least one carbon to carbon double bond, see "Synthetic Rubber," Whitby, published by John Wiley & Sons, New York, 1954.

Since the incorporation of the elastomer brings about the improved properties in the resulting cellular product, enough of the elastomer should be used to bring about the improvements. For purposes of the present invention, from about 0.5 to 10.0% by weight of the elastomer, in the form of a latex, based on the sum of the weights of the polyhydroxy compound and the polyisocyanate, should be incorporated with the reactants prior to the ultimate foaming step. It has been found that less than about 0.5% by weight of the elastomer does not bring about the desired improvements; whereas more than about 10.0% by weight is economically undesirable and, in addition, yields a cellular product having an undesirably high density.

As discussed above, the water reacts with the free isocyanate groups to liberate carbon dioxide, which forms the cellular product. The amount of water which is used should range from about 100 to 300% of the theoretical amount necessary to react with all of the free isocyanate groups present. Theoretically, one mol of water is required to react with two free isocyanate groups. For purposes of the present invention, the preferred amount of water which is used should range from about 120 to 200% of that which is necessary to react with all of the free isocyanate groups. If there is insufficient water present in the elastomeric latex which is used, additional water may be added.

Various other ingredients may be used in the formation of the cellular products of the present invention, such as tertiary amine catalysts, which will accelerate the reaction of the free isocyanate groups with the water. In addition, these catalysts will serve to accelerate the reaction of the organic polyisocyanate with the polymeric polyhydroxy compound in the processes wherein the isocyanate-terminated polymer is formed in situ. Other ingredients which may be added include surfactants, which will tend to control the size of the cells in the ultimate cellular product. Ethylene oxide condensation products and silicones such as polydimethyl siloxane are of considerable value.

Various processes and conditions may be used to prepare the cellular products of the present invention. Thus, all of the components, such as the isocyanate-terminated polymer and the elastomeric latex, may be mixed together and poured into a mold and allowed to foam at ambient conditions. The foaming step may be accelerated by the application of heat. In common with other isocyanate foams, it is desirable to maintain a relative humidity of above about 30% during the aftercuring step. In preparing these cellular products, the procedures may be carried out either batchwise or continuously. With either method, efficient agitation is necessary.

The incorporation of the elastomer in the form of a latex with the various reactants prior to the formation of the ultimate cellular product brings about improved advantages in the resulting product as compared with the cellular products which do not contain the elastomer. Thus, the cellular products of the present invention have improved load-bearing capacity and the resilience of the foams, more particularly the foams prepared from alkyd resins, is improved. In addition, the foams have an improved appearance since the foaming mass tends to fill the mold in which the foaming procedure is carried out more uniformly and the surface is uniformly smooth and thin. The products also have improved "hand," i.e., the products have a more rubbery feel than the products prepared without the use of the elastomer.

The improvement of load-bearing capacity of the cellular products of the present invention is entirely unexpected. Rubber and synthetic rubber foams of the same density generally have a lower load-bearing capacity than polyisocyanate foams. Hence, it was entirely unpredictable that the load-bearing capacity of the cellular products containing from 0.5 to 10.0% by weight of an elastomer would be greater than the well-known polyisocyanate cellular products themselves. In general, the load-bearing capacity of a foam decreases as its density decreases. As a result of this invention, low density polyisocyanate foams can be made which have the same load-bearing capacity as higher density polyisocyanate foams with a corresponding decrease in cost due to the lesser quantity of polyisocyanate and polyether glycol or polyester glycol present in a given volume of lower density foam.

The cellular products which are prepared according to the process of the present invention have a wide variety of uses, such as for cushions, upholstery, crashpads, insulation, packing material for fragile articles, rug underlay, mattresses, clothing insulation, slab stock, topper pads, etc.

The following examples will better illustrate the nature of the present invention; however, the invention is not intended to be limited to these examples. Parts are by weight unless otherwise indicated.

The following elastomers are used in the examples:

(A) A cationic neoprene latex containing 50% solids of a gel type polymer formed by the polymerization of 2-chlorobutadiene-1,3.

(B) An anionic neoprene latex containing 38% solids of a sol type polymer formed by the polymerization of 2-chlorobutadiene-1,3.

(C) An anionic neoprene latex containing 60% solids of a gel type polymer formed by the polymerization of 2-chlorobutadiene-1,3.

(D) An anionic latex containing 45% solids of a copolymer of 2-chlorobutadiene-1,3 and 2,3-dichlorbutadiene-1,3.

(E) An anionic latex of chlorinated polyethylene containing 30% chlorine. It is a sol type latex containing 43% solids.

(F) A natural rubber, concentrated, ammonia preserved, creamed latex containing 65% solids. It is diammoniated and has potassium hydroxide added to give a pH of 12.5.

(G) GR–S latex 2000 which is a 50/50 copolymer of butadiene and styrene containing 40% solids.

(H) Hycar 1552 Latex which is a copolymer of acrylonitrile and butadiene of medium acrylonitrile content. It has an average particle size of 1800 Angstroms and 50% solids content.

(I) Hycar 1562 Latex which is a copolymer of acrylonitrile and butadiene of medium acrylonitrile content having an average particle size of 500 Angstroms and 40% solids content.

(J) Hycar 1571 Latex which is a terpolymer of acrylonitrile, butadiene and methacrylic acid, of high acrylonitrile content. It has an average particle size of 1200 Angstroms and a 40% solids content.

(K) An anionic latex of a copolymer of 2-chlorobutadiene-1,3 and methacrylic acid. It has a solids content of 45% and a pH of 10–12.

*Example 1*

(A) An isocyanate-terminated polymer is prepared by first mixing 3000 parts of polytetramethyleneether glycol of molecular weight 3000 with 348 parts of a mixture of 80% toluene-2,4-diisocyanate and 20% toluene-2,6-diisocyanate, and heating at 60° C. for 2 hours and then adding an additional 350 parts of the toluenediisocyanate mixture and heating at 140° C. for an additional 2 hours. It is then cooled to room temperature. It has an isocyanate content of 8%. A further quantity of 131 parts of the toluenediisocyanate mixture is added to give an isocyanate content of 9.5%.

(B) A cellular product containing 2% by weight of elastomer C is made by adding to a vessel, in order, the following components while stirring efficiently:

| | Parts |
|---|---|
| Isocyanate-terminated polymer of A above | 94.8 |
| 80:20 mixture of toluene-2,4- and -2,6-diisocyanate | 5.2 |
| Polydimethylsiloxane of 50 centistrokes viscosity | 0.5 |
| N-methylmorpholine | 0.5 |
| Triethylamine | 0.5 |
| Latex elastomer C | 3.35 |
| Water | 1.65 |

The composition is stirred 18–20 seconds after the latex and water are added and then poured into a mold coated with high melting paraffin wax. The mold is placed in an oven at 70° C. for 30 minutes for foaming. The cellular product which is an elastic foam is removed from the mold and placed in an oven at 120° C. for 3 hours. It is then allowed to stand at room conditions for 3 days before testing.

A control is made in the same way except that no latex is added and the amount of water added is increased to 3.0 parts in order to provide a sufficient amount of water for foaming.

The density of both foams is 1.9 lbs./cubic foot. The compression-deflection properties of the two cellular products are measured according to ASTM Method D–575–46, Method A, using an Instron machine giving continuous deflection and recording continuously on a strip chart the force required. The test is run on a pellet of foam in the form of a cylinder 1 square inch in base area and 1 inch in height. The results are shown in the following table:

| Percent Deflection | Compression, Lbs./sq. in. | |
|---|---|---|
| | Example | Control |
| 10 | 0.40 | 0.32 |
| 20 | 0.51 | 0.40 |
| 30 | 0.59 | 0.46 |
| 40 | 0.68 | 0.54 |
| 50 | 0.83 | 0.66 |
| 60 | 1.10 | 0.87 |
| 70 | 1.65 | 1.34 |
| 80 | 3.32 | 2.79 |

The force necessary to accomplish the same deflection in the sample containing the latex in about 25% greater than in the control having no latex. Stated in another way, the sample containing latex can bear a load 25% greater at the same deflection.

(C) Using the same formulation as in B above, other elastomer latexes are substituted for elastomer C latex to give a cellular product containing approximately 2% by weight of the elastomer. The amount of water added is adjusted according to the contration of the latex so that a total of 3 parts of water is added. The density and compression values at 25% and 50% are shown in the following table:

| Elastomer | Parts Elastomer | Parts Water | Density Lbs. per Cu. Ft. | Compression, Lbs. per Sq. In. | |
|---|---|---|---|---|---|
| | | | | Deflection | |
| | | | | 25% | 50% |
| Control | | 3.0 | 1.9 | 0.37 | 0.57 |
| A | 4.00 | 1.00 | 1.97 | 0.57 | 0.88 |
| B | 5.00 | | 1.90 | 0.53 | 0.77 |
| D | 4.44 | 0.56 | 2.28 | 0.57 | 0.89 |
| E | 4.65 | 0.35 | 2.04 | 0.49 | 0.72 |
| F | 3.08 | 1.90 | 1.99 | 0.44 | 0.62 |
| G | 5.00 | | 2.22 | 0.45 | 0.73 |
| H | 4.00 | 1.00 | 2.46 | 0.64 | 1.03 |
| J | 5.00 | | 2.35 | 0.62 | 0.95 |

*Example 2*

(A) An isocyanate-terminated polymer is prepared by mixing 1000 parts of polytetramethyleneether glycol of molecular weight 1000 with 278 parts of toluene-2,4-diisocyanate and heating at 80° C. for 2 hours. The resulting polymer has an isocyanate content of 4%.

(B) A cellular product containing about 2.4% by weight of elastomer A is made by efficiently mixing the following ingredients in order:

| | Parts |
|---|---|
| Isocyanate-terminated polymer of A above | 88.0 |
| 80:20 mixture of toluene-2,4- and -2,6-diisocyanate | 12.0 |
| Polydimethylsiloxane of 50 centistokes viscosity | 0.5 |
| N-methylmorpholine | 0.5 |
| Triethylamine | 0.5 |
| Elastomer A latex | 4.8 |

Stirring is continued for 18–20 seconds after the addition of the latex and the mass is poured into a paraffin-coated mold. The mold is placed in an oven at 70° C. for 30 minutes for foaming to be completed. It is then removed from the mold and placed in an oven at 120° C. for 3 hours to cure. It is allowed to stand under room conditions for 3 days before testing. It has a density of 2.4 lbs./cubic foot.

A control is made without any latex but using 2.4 parts of water. This control has a density of 2.3 lbs./cubic foot.

Compression-deflection tests show the following:

| Percent Deflection | Compression, Lbs./sq. in. | |
|---|---|---|
| | Example | Control |
| 10 | 0.35 | 0.25 |
| 20 | 0.40 | 0.33 |
| 30 | 0.49 | 0.37 |
| 40 | 0.60 | 0.45 |
| 50 | 0.75 | 0.52 |
| 60 | 1.10 | 0.66 |
| 70 | 2.10 | 1.00 |
| 80 | 2.75 | 1.90 |

*Example 3*

(A) 2000 parts of polypropyleneether glycol of molecular weight 2000 is mixed with 470 parts of an 80:20 mixture of toluene-2,4- and -2,6-diisocyanate and heated at 60° C. for 2 hours. An additional 365 parts of the mixed toluenediisocyanate is added and the mass is heated at 140° C. for 2 hours and then cooled.

(B) A cellular product containing about 2.3% by weight of elastomer A is prepared by mixing the following ingredients in order with thorough agitation:

| | Parts |
|---|---|
| Isocyanate-terminated polymer of A above | 100.0 |
| 80:20 mixture of toluene-2,4- and -2,6-diisocyanate | 5.3 |
| Polydimethylsiloxane of 50 centistokes viscosity | 0.5 |
| N-methylmorpholine | 0.5 |
| Triethylamine | 0.5 |
| Elastomer A latex | 4.6 |

Stirring is continued for 18–20 seconds after the addition of the latex and the mass is poured into a paraffin-lined mold to foam. It is put in an oven at 70° C. for 30 minutes and the mold stripped from the foamed product which is further cured by heating in an oven at 120° C. for 3 hours. It is then allowed to stand for 3 days at room temperature. A strong, elastic foam is obtained which has good resilience and has a higher load-bearing capacity than a control made by substituting 2.3 parts of water for the latex in the above formulation.

*Example 4*

(A) 1500 parts of polytetramethyleneether glycol of molecular weight 3000 is stirred with 140 parts of m-phenylene-diisocyanate and 36 parts of 2,4,4'-triisocyanatodiphenylether at 45–50° C. for 30 minutes and then stirred a further 4 hours without heating. The isocyanate content of the polymer is 3.0%.

(B) The above polymer is used to make a foamed product containing about 2% by weight of elastomer A by mixing the following ingredients, in order, with thorough agitation:

| | Parts |
|---|---|
| Isocyanate-terminated polymer of A above | 100.0 |
| 80:20 mixture of toluene-2,4- and -2,6-diisocyanate | 25.0 |
| Polydimethylsiloxane of 50 centistokes viscosity | 1.0 |
| N-methylmorpholine | 2.0 |
| Elastomer A latex | 5.2 |

Stirring is continued for 18–20 seconds after the latex is added. The mass is promptly poured into a paraffin-lined mold and put in an oven at 70° C. for 30 minutes to foam. The mold is then stripped off. The cellular product fills the mold completely and a smooth uniform surface is formed. The cellular product is put in an oven at 120° C. for 3 hours to cure. After cooling, a tough, resilient foam is obtained. It has a better load-bearing capacity, as determined by compression-deflection readings, than a control made using 2.6 parts of water instead of the latex.

*Example 5*

(A) The isocyanate-terminated polymer of Example 1–A is used with different amounts of a latex of elastomer A. The following formulations are mixed and foamed by the procedure of Example 1:

| | Parts | |
|---|---|---|
| | (1) | (2) |
| Isocyanate-terminated Polymer of Example 1–A | 100.0 | 100.0 |
| Polydimethylsiloxane | 0.5 | 0.5 |
| N-methylmorpholine | 0.5 | 0.5 |
| Triethylamine | 0.5 | 0.5 |
| Elastomer A latex | 12.0 | 1.0 |
| Water | | 1.9 |

The 12.0 parts of and 1.0 part of elastomer A latex is equivalent to 6.0% by weight and 0.5% by weight, respectively, of elastomer A.

Formulation 1 has a density of 3.0 lbs./cu. ft. while Formulation 2 has a density of 2.9 lbs./cu. ft.

The compression in lbs./sq. in. for Formulation 1 at 25% and 50% deflection is 0.56 and 0.85 respectively. For Formulation 2 the compression at these same deflections is 0.47 and 0.79.

*Example 6*

(A) A polyester glycol is formed in the conventional manner by esterification of adipic acid with 1,4-butanediol. It has a hydroxyl number of 59.4, acid number of 2.6, water content of 0.03%, and an average molecular weight of 2000.

(B) A cellular product containing about 2% by weight of elastomer C is obtained by mixing the following ingredients, in order, with thorough agitation:

| | Parts |
|---|---|
| Polyester glycol of A above | 70.0 |
| Non-ionic surfactant made by condensing propylene oxide with propylene glycol and then reacting with ethylene oxide. Average molecular weight 2500 | 1.0 |
| N-methylmorpholine | 1.0 |
| Non-ionic surfactant made by condensing about 16–18 mols ethylene oxide with a long chain fatty alcohol | 1.0 |
| Elastomer C latex | 3.3 |
| 80:20 mixture of toluene-2,4- and -2,6- diisocyanate | 30.0 |

The mixture is stirred for 8–10 seconds after the addition of the diisocyanate mixture and immediately poured into a mold. The mold is placed in an oven at 70° C. for 30 minutes for the formation of the cellular product. The mold is then removed from the foam and the foam is put in an oven at 120° C. for 3 hours to complete the cure.

A control is run using 1 part of water instead of the latex.

After standing for 3 days, the foams have the following properties:

|  | Compression, Lbs./sq. in. ||
|---|---|---|
|  | Example | Control |
| Deflection, percent: |  |  |
| 10 | 1.04 | 0.65 |
| 20 | 1.20 | 0.78 |
| 30 | 1.38 | 0.96 |
| 40 | 1.56 | 1.16 |
| 50 | 1.80 | 1.42 |
| 60 | 2.25 | 1.72 |
| 70 | 3.28 | 2.52 |
| 80 | 6.28 | 5.14 |
| Density, lbs./cu. ft | 2.60 | 2.64 |

Other elastomer latexes are substituted for the elastomer A latex in amounts sufficient to give 2% by weight of elastomer. The foams are prepared in the same way and show the following properties:

| Elastomer | Density, Lbs./cu. ft. | Compression, Lbs./sq. in. ||
|---|---|---|---|
|  |  | Deflection ||
|  |  | 25% | 50% |
| None | 2.65 | 0.88 | 1.48 |
| C | 2.60 | 1.13 | 1.73 |
| D | 2.53 | 0.95 | 1.26 |
| G | 2.11 | 1.11 | 2.11 |
| I | 2.50 | 1.21 | 1.54 |
| J | 2.71 | 1.17 | 1.58 |
| K | 2.75 | 1.27 | 1.86 |

*Example 7*

(A) An isocyanate-terminated polymer is prepared by mixing 70 parts of a polyester glycol (hydroxyl No. 59.4, acid No. 2.6, molecular weight 2000) made from adipic acid and 1,4-butanediol with 30 parts of 80:20 mixture of toluene-24- and -2,6-diisocyanate at room temperature and permitting the heat of reaction to raise the temperature to about 70–80° C. while stirring over a period of about 1 hour. The temperature is then raised over the course of an hour to 100° C. and held there for 1 hour. The mass is then cooled. It has an isocyanate content of 8%.

(B) The following ingredients are mixed, in order, to prepare a foam containing about 2% by weight of elastomer J:

| | Parts |
|---|---|
| Isocyanate-terminated polymer of A above | 90.9 |
| 80:20 mixture of toluene-2,4- and -2,6-diisocyanate | 9.1 |
| A blend of polyalcohol carboxylic acid esters and oil-soluble sulfonates sold as Witco 77 | 1.0 |
| N-methylmorpholine | 1.0 |
| Elastomer J latex | 5.0 |

The mixture is stirred vigorously for 18–20 seconds after the latex is added and poured into a mold. The mold is placed in an oven at 70° C. for 30 minutes, the mold removed, and the cellular product cured at 120° C. for 3 hours. A tough, resilient foam of good load-bearing capacity is obtained.

*Example 8*

(A) A polymer is prepared by reacting 1000 parts of polytetramethyleneether glycol of molecular weight 3000 with 55 parts of toluene-2,4-diisocyanate and 38 parts of 2,4,4'-triisocyanatodiphenylether. The temperature is held at about 60° C. by cooling until exothermic reaction is over. The reaction mass is then stirred at 38–43° C. for 6 hours. There is then added 154 parts of toluene-2,4-diisocyanate which is thoroughly mixed in.

(B) A cellular reaction product containing 2.5% by weight of elastomer A is prepared by mixing together the following ingredients, in order, with thorough agitation:

| | Parts |
|---|---|
| Isocyanate-terminated polymer of A above | 97.4 |
| 80:20 mixture of toluene-2,4- and -2,6-diisocyanate | 2.6 |
| Polydimethylsiloxane of 50 centistokes viscosity | 0.5 |
| N-methylmorpholine | 0.5 |
| Triethylamine | 0.5 |
| Elastomer A latex | 5.0 |

The mixture is stirred 18–20 seconds after the addition of the latex and is immediately poured into a mold. The mold is placed in an oven at 70° C. for 30 minutes. The mold is then removed and the cellular product is placed in an oven at 120° C. for 3 hours. A control sample is made by the same procedure except that 2.5 parts of water is substituted for the latex. After standing for 3 days, the sample containing latex has superior load-bearing capacity and resilience.

*Example 9*

A cellular product is made in a continuous manner by feeding two streams into a mixing device which immediately discharges the product into a mold. The first stream consists of a mixture of 100 parts of the isocyanate-terminated polymer of Example 1–A and 0.5 part of polydimethylsiloxane of 50 centistokes viscosity. The second stream consists of 4 parts of Elastomer A latex, having a pH of 8.5, to which has been added slowly with good agitation 1.5 parts of N-methylmorpholine and 0.2 part of a condensation product of 16–18 mols of ethylene oxide and a long-chain fatty alcohol. The mixer consists of a 1¼" inside diameter pipe in which is an agitator consisting of a continuously bent wire, being bent in the form of S-shapes in one plane, and fitted with suitable inlet nozzles at the top. The agitator is driven by a motor at about 2000 r.p.m.

To this mixer is fed 3600 parts of stream 1 per minute and 250 parts of stream 2 per minute. The mass is permitted to foam after it falls into the mold and the molds are moved continuously underneath the exit of the mixing tube. After foaming and curing as in the previous examples, the cellular product containing about 2.1% by weight of elastomer A has a density of 2.4 lbs./cu.ft. and shows a compression of 0.6 and 1.0 lb./sq.in. and has a 25% and 50% deflection respectively. It has a Yerzley resilience of 52.

*Example 10*

(A) An isocyanate-terminated polymer is prepared by first mixing 3000 parts of polytetramethyleneether glycol of molecular weight 3000 with 348 parts of a mixture of 80% toluene-2,4-diisocyanate and 20% toluene-2,6-diisocyanate and heating at 60° C. for 2 hours and then adding an additional 35 parts of the toluenediisocyanate mixture and heating at 140° C. for an additional 2 hours. It is then cooled to room temperature. It has an isocyanate content of 8%. A further quantity of 131 parts of the toluenediisocyanate mixture is added to give an isocyanate content of 9.5%.

(B) A cellular product containing about 2.4% by weight of elastomer A is made by adding to a vessel, in order, the following components while stirring efficiently:

| | Parts |
|---|---|
| Isocyanate-terminated polymer of A above | 100.0 |
| Polydimethylsiloxane of 50 centistokes viscosity | 0.5 |
| N-methylmorpholine | 0.5 |
| Triethylamine | 0.5 |
| Elastomer A latex | 4.8 |

The composition is stirred 18–20 seconds after the latex is added and then poured into a mold coated with high-melting paraffin wax. The mold is placed in an oven at 70° C. for 30 minutes for foaming. The cellular product which is an elastic foam is removed from the mold and placed in an oven at 120° C. for 3 hours. It is then allowed to stand at room conditions for 3 days before testing. This cellular product has a density of 2.6 lbs./cu.ft.

A control is made in the same way except that 2.4 parts of water is used instead of the latex. This control has a density of 2.4 lbs./cu.ft.

The compression-deflection properties of the two cellular products are measured according to ASTM Method D-575-46, Method A, using an Instron machine giving continuous deflection and recording continuously on a strip chart the force required. The test is run on a pellet of foam in the form of a cylinder 1 square inch in base area and 1 inch in height. The results are shown in the following table:

| Percent Deflection | Compression, Lbs./sq. in. | |
| --- | --- | --- |
| | Example | Control |
| 25 | 0.70 | 0.54 |
| 50 | 1.03 | 0.81 |

The force necessary to accomplish the same deflection in the sample containing the latex is about 25% greater than in the control having no latex. Stated in another way, the sample containing latex can bear a load 25% greater at the same deflection.

As many widely different embodiments of this invention may be made without departing from the spirit and scope thereof, it is to be understood that this invention is not limited to the specific embodiments thereof except as defined in the appended claims.

What is claimed is:

1. In the process of preparing cellular products from (a) an organic polyisocyanate, (b) water and (c) a polyhydroxy compound having a molecular weight of from about 750 to 3500 and being selected from the group consisting of polyalkyleneether glycols, polyalkyleneether-thioether glycols, and hydroxyl-terminated polyesters, said polyesters being prepared from polycarboxylic acids and polyhydric alcohols, said polyhydroxy compound being reacted with a molar excess of said organic polyisocyanate so as to obtain a reaction product containing a free isocyanate content of from about 9 to 15% by weight, there then being employed an amount of water ranging from about 100 to 300% of the theoretical amount necessary to react with all of the free isocyanate groups of said reaction product, the step which comprises incorporating into the reaction mass, prior to the formation of the cellular product, from about 0.5 to 10.0% by weight, based on the sum of the weights of the polyhydroxy compound and organic polyisocyanate, of an elastomer in the form of an unfoamed latex having about 38 to 65% solids content and containing no gelling agents, said elastomer being selected from the group consisting of natural rubber; sulfochlorinated polyethylene; chlorinated polyethylene, polymers of 2-chlorobutadiene-1,3; copolymers of 2-chlorobutadiene-1,3 and 2,3-dichlorobutadiene-1,3; butadiene-methacrylate copolymers; butadiene-acrylonitrile copolymers; butadiene-styrene copolymers; terpolymers of acrylonitrile, butadiene and methacrylic acid; and copolymers of 2-chlorobutadiene-1,3 and methacrylic acid.

2. The process of claim 1 wherein the polyhydroxy compound is a polyalkyleneether glycol.

3. The process of claim 2 wherein the polyalkyleneether glycol is a polytetramethyleneether glycol.

4. The process of claim 1 wherein the elastomer in the form of a latex which is incorporated into the reaction mass prior to the formation of the cellular product is a polymer of 2-chlorobutadiene-1,3.

5. The process of preparing cellular products which comprises incorporating with an isocyanate-terminated polymer composition having a free isocyanate content of from about 9 to 15% by weight, said composition being prepared by reacting a polyalkyleneether glycol having a molecular weight of from about 750 to 3500 with a molar excess of an organic polyisocyanate, an unfoamed elastomer latex having about 38 to 65% solids content and containing no gelling agents, said elastomer being selected from the group consisting of natural rubber; sulfo-chlorinated polyethylene; chlorinated polyethylene; polymers of 2-chlorobutadiene-1,3; copolymers of 2-chlorobutadiene-1,3 and 2,3-dichlorobutadiene-1,3; butadiene-methacrylate copolymers; butadiene-acrylonitrile copolymers; butadiene-styrene copolymers; terpolymers of acrylonitrile, butadiene and methacrylic acid; and copolymers of 2-chlorobutadiene-1,3 and methacrylic acid; said latex containing from about 0.5 to 10.0% by weight of said elastomer based on the weight of said isocyanate-terminated polymer composition, there being present in said latex an amount of water ranging from about 100 to 300% of the theoretical amount necessary to react with all of the free isocyanate groups in said isocyanate-terminated polymer composition, whereby a cellular product is obtained.

6. The process of claim 5 wherein the polyalkyleneether glycol is a polytetramethyleneether glycol.

7. The proces of claim 6 wherein the elastomer latex is a latex of a polymer of 2-chlorobutadiene-1,3.

8. The cellular products prepared according to the process of claim 1.

References Cited in the file of this patent

FOREIGN PATENTS 1,103,628   France _____ May 25, 1955